United States Patent
Higley et al.

(10) Patent No.: US 11,719,892 B2
(45) Date of Patent: Aug. 8, 2023

(54) SMALL FORM FACTOR FIBER OPTIC CONNECTOR WITH CROSSED ANGLE POLISHED FERRULES AND POLISHING CAP THEREFOR

(71) Applicant: US Conec, Ltd, Hickory, NC (US)

(72) Inventors: Jason Higley, Hickory, NC (US); Mitchell Cloud, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 87 days.

(21) Appl. No.: 17/374,123

(22) Filed: Jul. 13, 2021

(65) Prior Publication Data

US 2022/0011525 A1    Jan. 13, 2022

Related U.S. Application Data

(60) Provisional application No. 63/050,915, filed on Jul. 13, 2020.

(51) Int. Cl.
*G02B 6/38* (2006.01)
(52) U.S. Cl.
CPC ......... *G02B 6/3871* (2013.01); *G02B 6/3863* (2013.01); *G02B 6/3825* (2013.01)

(58) Field of Classification Search
CPC ...... G02B 6/38; G02B 6/3871; G02B 6/3825; G02B 6/3863
See application file for complete search history.

(56) References Cited

U.S. PATENT DOCUMENTS

| 10,042,126 B2 | 8/2018 | Taira et al. | |
|---|---|---|---|
| 2019/0154922 A1* | 5/2019 | Elenbaas | G02B 6/3878 |
| 2020/0156208 A1* | 5/2020 | Wong | B24B 41/06 |
| 2021/0080655 A1 | 3/2021 | Hendrick | |
| 2021/0364705 A1* | 11/2021 | Crawford | G02B 6/3893 |

FOREIGN PATENT DOCUMENTS

| WO | 2020160254 A1 | 8/2020 |
|---|---|---|
| WO | 2021050921 A1 | 3/2021 |
| WO | 20210237127 A1 | 11/2021 |

* cited by examiner

*Primary Examiner* — Tina M Wong
(74) *Attorney, Agent, or Firm* — Michael L Leetzow PLLC; Shubhrangshu Sengupta

(57) ABSTRACT

A fiber optic connector housing has a first portion to receive fiber optic ferrule holders and fiber optic ferrules. The fiber optic connector housing also includes a second portion for use during polishing and before one of the fiber optic ferrule holders is rotated 180°. The second portion is removed to allow for rotation and a third portion is attached to the first portion for connection with another fiber optic connector or assembly.

19 Claims, 16 Drawing Sheets

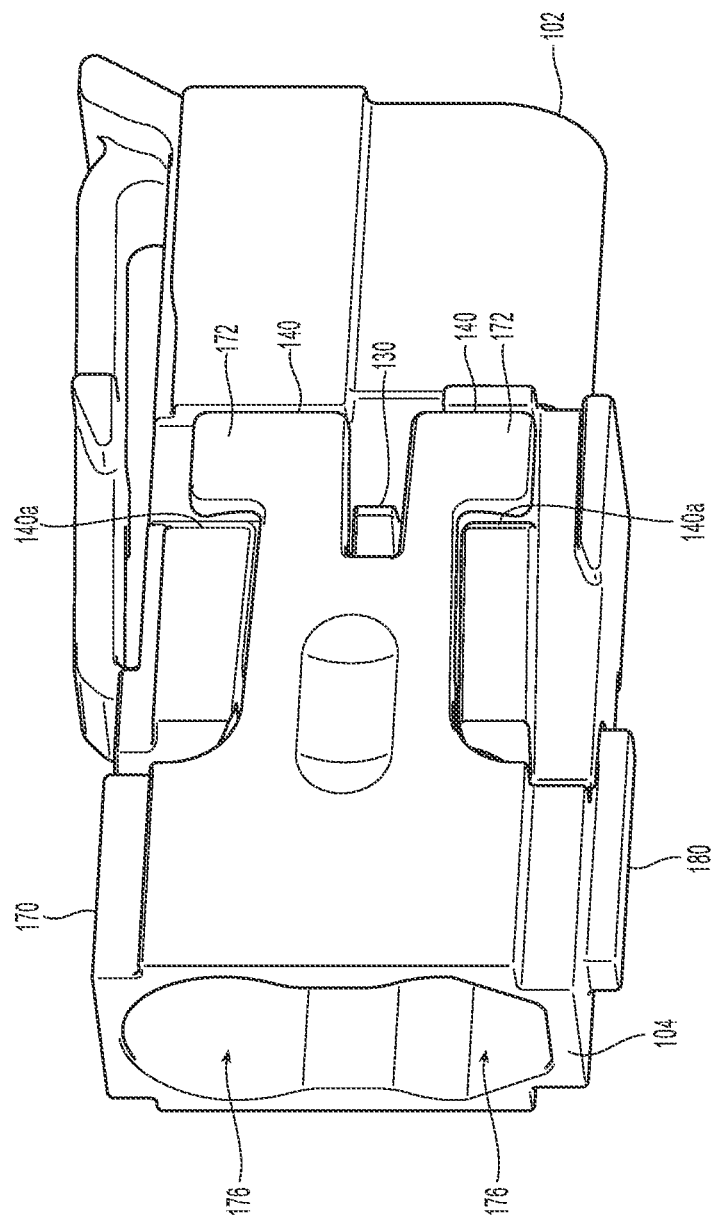

SMALL FORM FACTOR FIBER OPTIC CONNECTOR WITH CROSSED ANGLE POLISHED FERRULES AND POLISHING CAP THEREFOR

REFERENCE TO RELATED CASE

This application claims priority under 35 U.S.C. § 119 (e) to U.S. provisional application No. 63/050,915 filed on Jul. 13, 2020, the contents of which are hereby incorporated by reference in their entirety.

BACKGROUND OF THE INVENTION

Small Form Factor duplex connectors are used in tight spaces in various optical communication setups (e.g., cassettes). Typically, such duplex connectors, such as the one described in Applicant's International Patent Application No. PCT/US20/15858 and entitled "Small Form Factor Connector and Adapter ("the '858 application"), have fiber optic ferrules with flat-polished end faces. While larger duplex connectors with angled-polished end faces are known, such as the one shown in U.S. Pat. No. 10,042,126, polishing smaller duplex connectors is a challenge due to smaller overall dimensions of the housing of the connector and the lack of a spring to maintain fiber optic ferrule positioning inside the housing during polishing. This challenge is further exacerbated by angled ferrules that are crossed in orientation, such as the ones in Applicant's U.S. patent application Ser. No. 17/018,508, titled "Multi-Ferrule Angle Polished Connector with Simplified Polarity Reversal." Polishing machines only allow for polishing the end faces of both the ferrules in the same direction. Further, angled polished fiber optic ferrules require a stricter tolerance for proper seating and angular orientation during and after polishing (e.g., during mating).

Thus, there is a need for a fiber optic connector housing that allows for both polishing and mating within the same the same connector housing.

SUMMARY OF THE INVENTION

According to one aspect, the present invention is directed to a fiber optic connector housing for a duplex connector that includes a first portion for receiving two fiber optic ferrule holders, the fiber optic ferrule holders having a fiber optic ferrule disposed in each of the fiber optic ferrule holders, one of the fiber optic ferrule holders rotatable from a first position to a second position and the second fiber optic ferrule holder being substantially stationary relative to the first portion, a second portion removably attachable to the first portion, the second portion having openings therein to receive the fiber optic ferrules therethrough and at least one projection extending from and along a first inside wall and having at least one engagement surface, the at least one engagement surface configured to engage a surface on each of the fiber optic ferrule holders in the first position.

In some embodiments, the at least one projection comprises a first projection and a second projection and the at least one engagement surface comprises a first engagement surface on the first projection and a second engagement surface on the second projection and each of the first engagement surface and the second engagement surface engage a respective surface on the fiber optic ferrule holders in the first position.

In some embodiments, the first portion is a polishing cap for insertion into a polishing jig.

In some embodiments, the first engagement surface and the second engagement surface engage the same corresponding surface on a respective fiber optic ferrule holder.

In some embodiments, wherein the first portion is a final cap, the final cap configured to mate with a receptacle having a duplex connector therein.

In some embodiments, there are detents in the first portion to engage the fiber optic ferrule holder.

In some embodiments, there is a third portion, the third portion removably attachable to the first portion when the second portion is unattached, the third portion having openings therein to receive the fiber optic ferrules therethrough, a third projection extending from and along a first inside wall and having an engagement surface to engage one of the two fiber optic ferrule holders, and a fourth projection extending from and along a second inside wall on an opposing side of the third portion and having an engagement surface to engage the other of the two fiber optic ferrule holders.

In yet another aspect, there is a fiber optic connector housing for a duplex connector that includes a first portion for receiving two fiber optic ferrule holders, the fiber optic ferrule holders having a fiber optic ferrule disposed in each of the fiber optic ferrule holders, one of the fiber optic ferrule holders rotatable from a first position to a second position and the second fiber optic ferrule holder being substantially stationary relative to the first portion, a second portion removably attachable to the first portion, the second portion having openings therein to receive the fiber optic ferrules therethrough and at least one projection extending from and along a first inside wall and having at least one engagement surface, the at least one engagement surface configured to engage a surface on each of the fiber optic ferrule holders in the first position; and a third portion, the third portion removably attachable to the first portion when the second portion is unattached, the third portion having openings therein to receive the fiber optic ferrules therethrough, a third projection extending from and along a first inside wall and having at least one engagement surface to engage one of the two fiber optic ferrule holders, and a f projection extending from and along a second inside wall on an opposing side of the third portion and having at least one engagement to engage the other of the two fiber optic ferrule holders.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 13 is a side perspective view of the first and second portions of the fiber optic connector housing;

DETAILED DESCRIPTION OF THE INVENTION

Figure 1A:
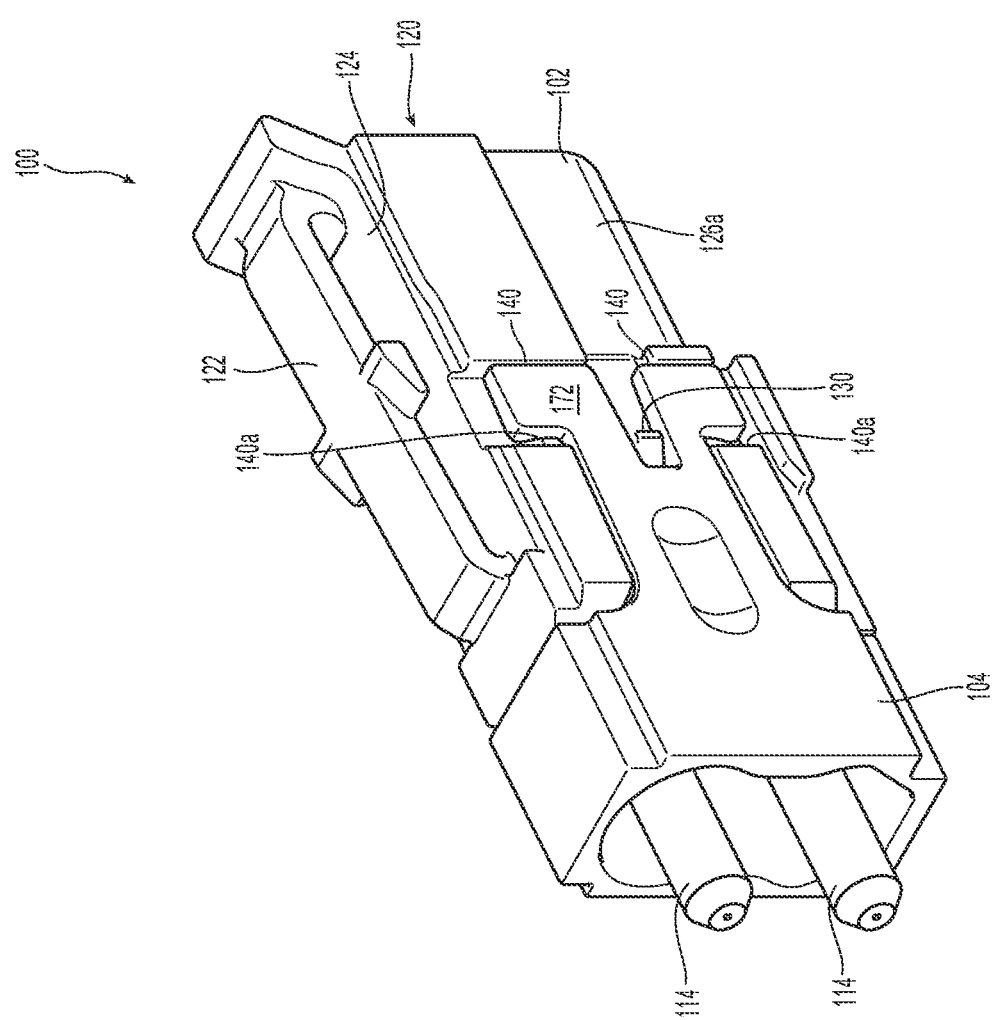
FIG. 1A is a perspective view of one embodiment of a fiber optic connector housing according to the present invention showing the first portion with a polishing cap or second portion.

Reference will now be made in detail to the present preferred embodiment(s) of the invention, examples of which are illustrated in the accompanying drawings. Whenever possible, the same reference numerals will be used throughout the drawings to refer to the same or like parts.

Figure 1B:
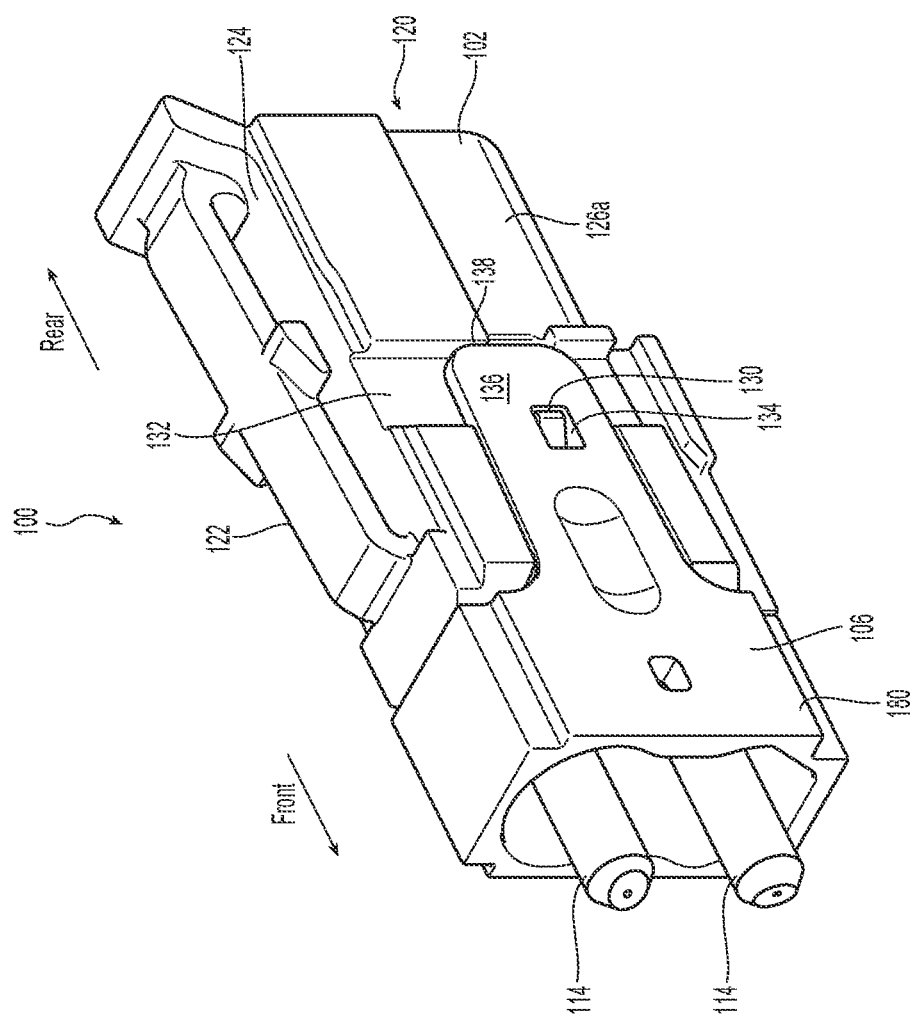
FIG. 1B is a perspective view the first portion fiber optic connector housing of FIG. 1A with a final cap or third portion.
Figure 2:
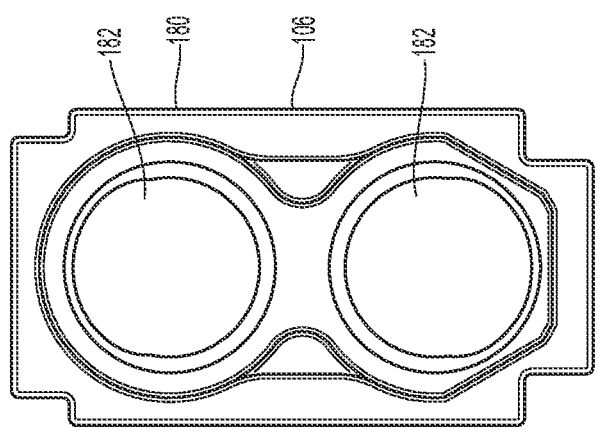
FIG. 2 is a front elevation view of the final cap or third portion.

Illustrated in FIGS. 1A and 1B is a fiber optic connector housing 100 for a duplex connector that has a first portion 102, a second portion 104 (a polishing cap) and a third portion 106 (a final cap). See FIGS. 1B and 2. It should be noted (and as discussed in detail below) that only one of the second portion 104 and the third portion 106 can be attached to the first portion 102 of the fiber optic connector housing 100 at a time. Additionally, only one of the second and third portions 104,106 can be attached at any time and only if the fiber optic ferrule holders 112 are in the correct position in the first portion 102. The present invention makes it impossible to have the fiber optic ferrules 114 in the wrong position for the fiber optic connector housing 100.

Applicant notes that the term "front" or "forward" means that direction where the duplex connector and/or device would meet with another fiber optic ferrule, connector or device, while the term "rear" or "rearward" is used to mean the direction from which the optical fibers enter into the fiber-optic ferrule or fiber optic connector. In the present application, the fiber optic connector housing 100 will therefore have a front and a rear, the front will be inserted a polishing jig, adapter, or other receptacle, while the rear is in the direction where the optical fibers are inserted into the fiber optic connector housing 100. Thus, in FIGS. 1A and 1B, the "front" of the fiber optic connector housing 100 is on the left side of the figure and pointing out of the page. The "rear" or "back" is that part of the fiber optic connector housing 100 that is on the right side of the page and "rearward" and "backward" is toward the right and into the page.

Figure 3:
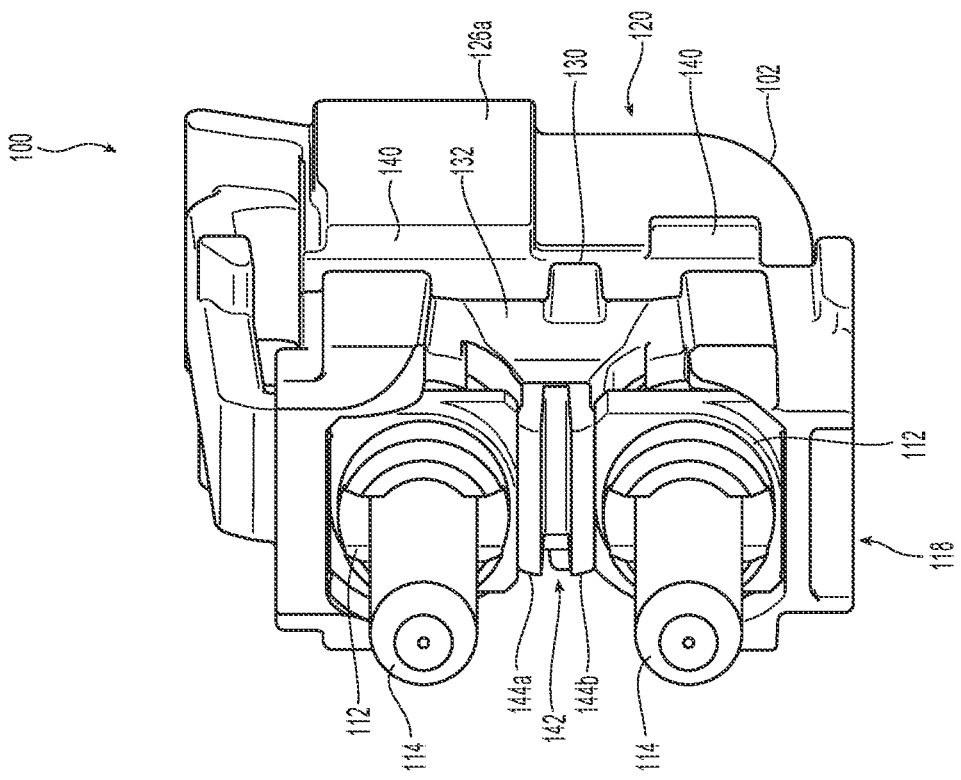
FIG. 3 is a perspective view the fiber optic connector housing of FIG. 1A with no cap.
Figure 10:
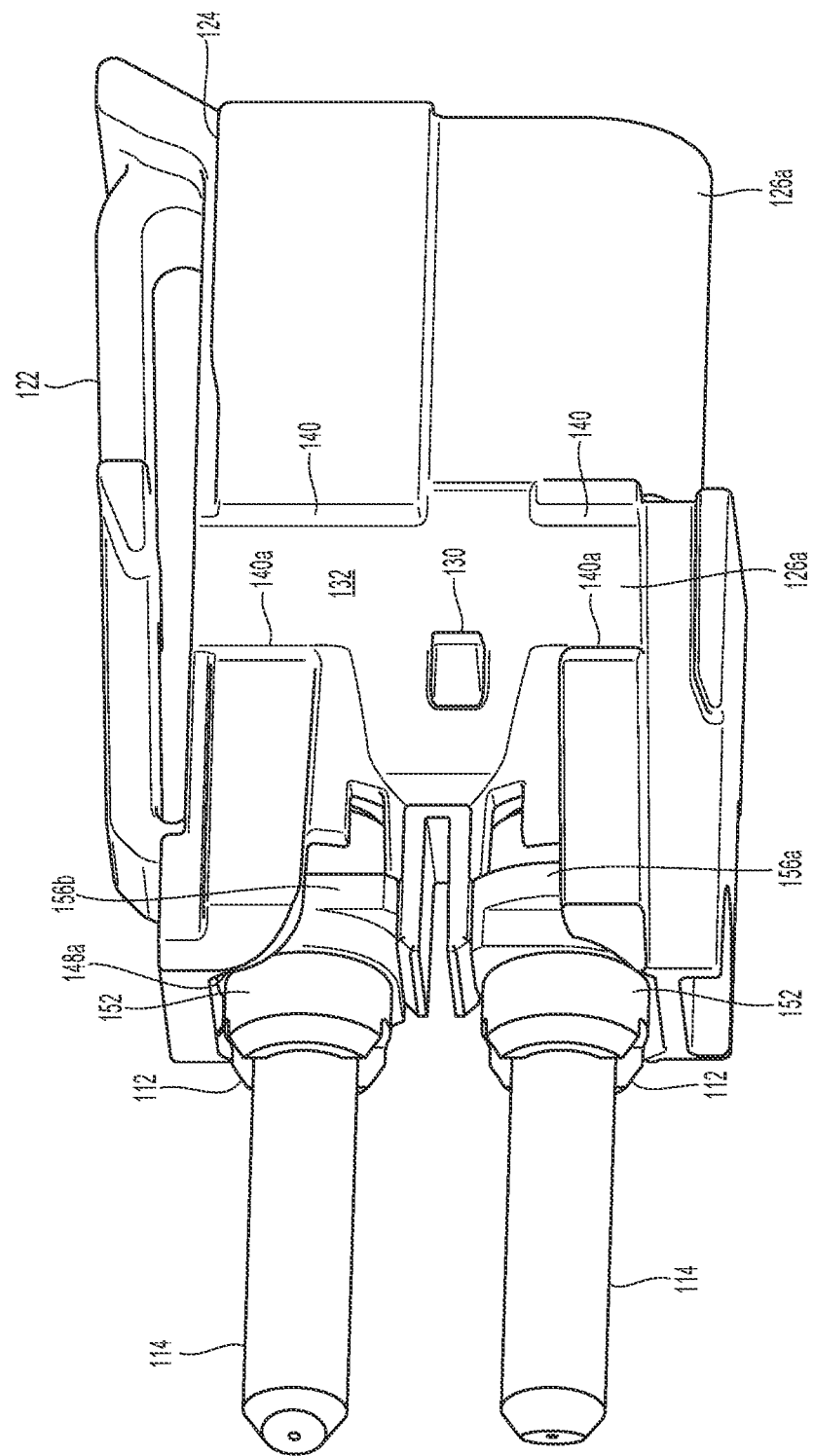
FIG. 10 is a side perspective view of the first portion of the fiber optic connector housing with the caps removed and the bottom fiber optic ferrule holder and fiber optic ferrule rotated.
Figure 11:
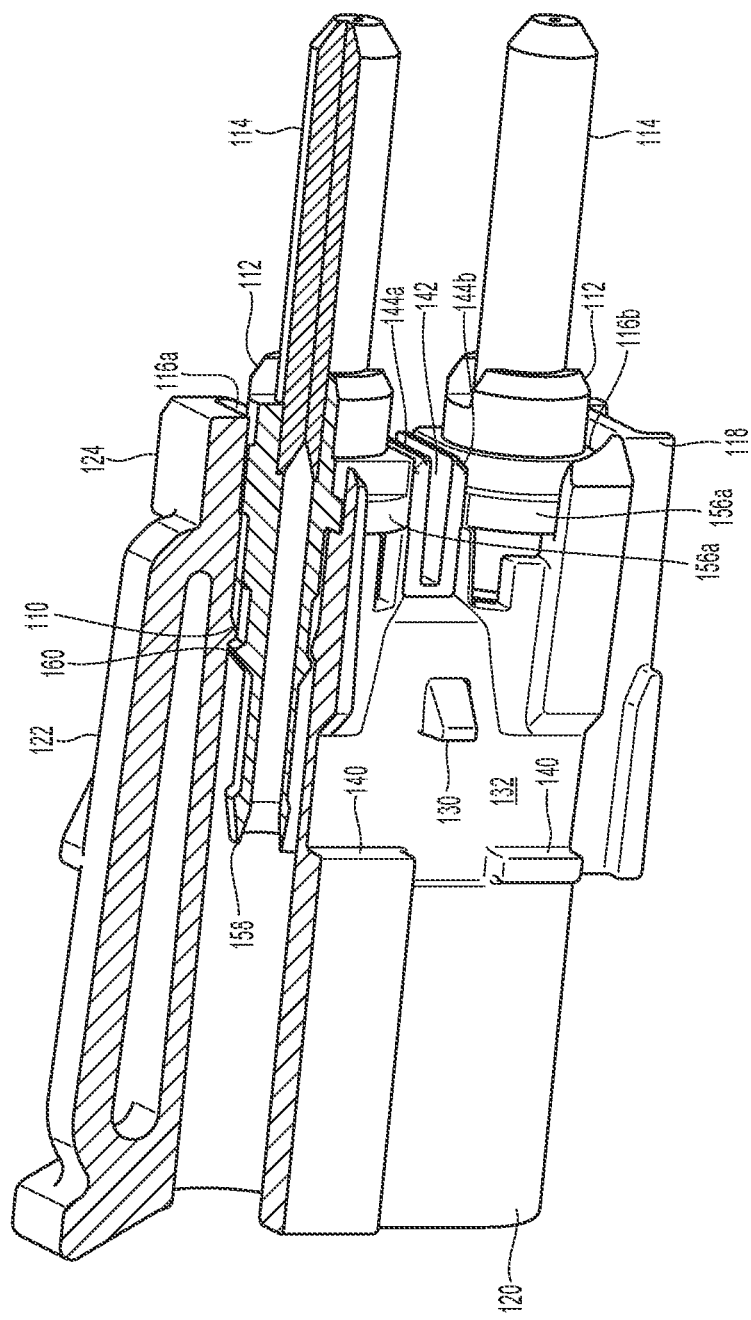
FIG. 11 is a partial cross section view of the first portion of the fiber optic connector housing with the bottom fiber optic ferrule holder and fiber optic ferrule rotated.
Figure 12:
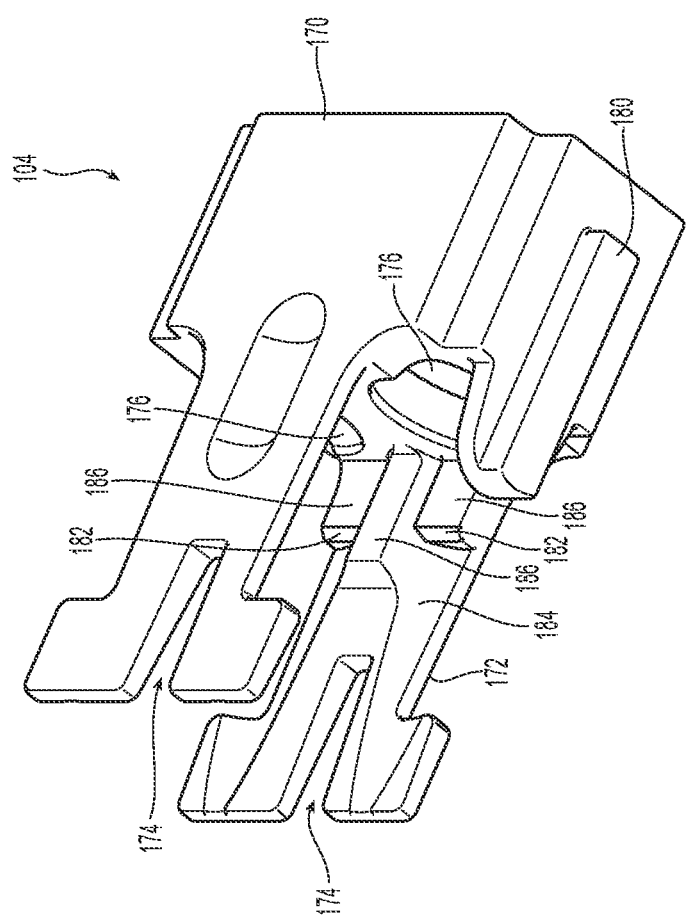
FIG. 12 is a perspective view of the second portion of the fiber optic connector housing.
Figure 18:
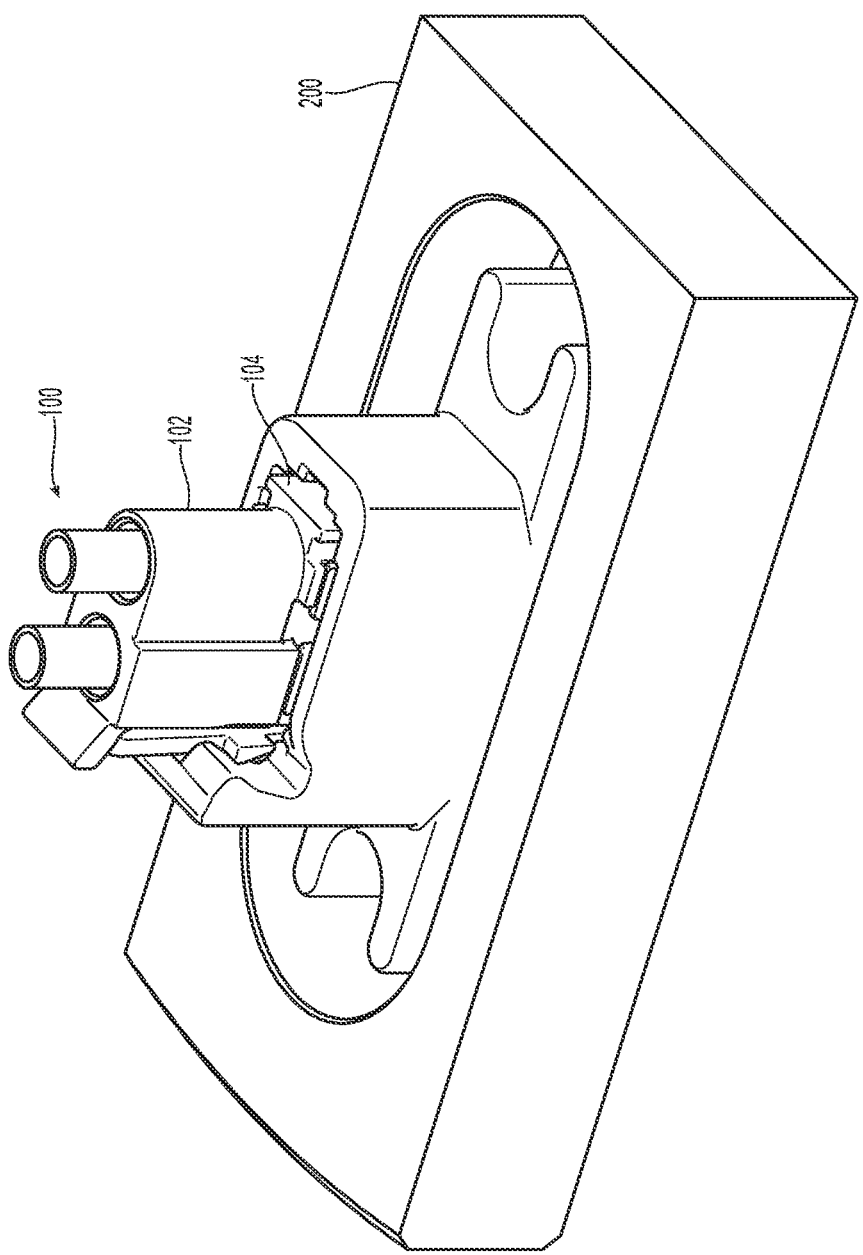
FIG. 18 is a perspective view of the fiber optic connector housing in an adapter and attached to a portion of a polishing jig.
Figure 19:
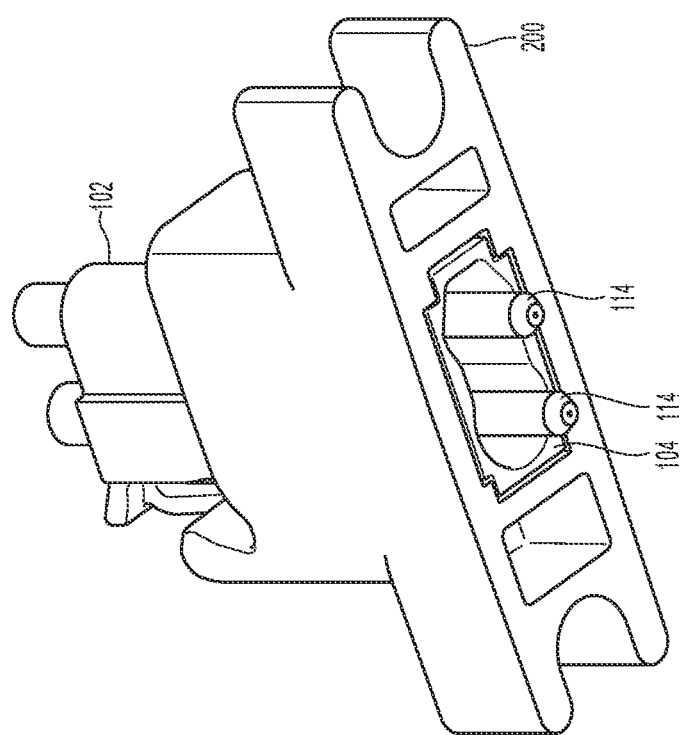
FIG. 19 is a bottom perspective view of the polishing jig in FIG. 18.

The first portion 102 receives two fiber optic ferrule holders 112, the fiber optic ferrule holders 112 each having a fiber optic ferrule 114 disposed therein. See, e.g., FIG. 3. The first portion 102 has an opening 116a,116b for a respective one of the fiber optic ferrule holders 112, the openings 116a,116b extending from a front end 118 to a rear end 120 of the first portion 102. See FIGS. 5 and 6. The openings 116a,116b may communicate with one another along a length of the first portion 102, or they may be completely separate as illustrated. The fiber optic ferrule holders 112 are inserted into the first portion 102 from the front end 118. See FIGS. 3, 10, and 11. The optical fibers (not shown) are inserted through the rear end 120 and into the fiber optic ferrules 114. The first portion 102 may also have an adapter latch 122 on a top side surface 124 thereof to secure the fiber optic connector housing 100 within the adapter or other receptacle (see FIGS. 18 and 19) into which the fiber optic connector housing 100 is inserted for mating or for polishing the fiber optic ferrule 114.

Figure 4:
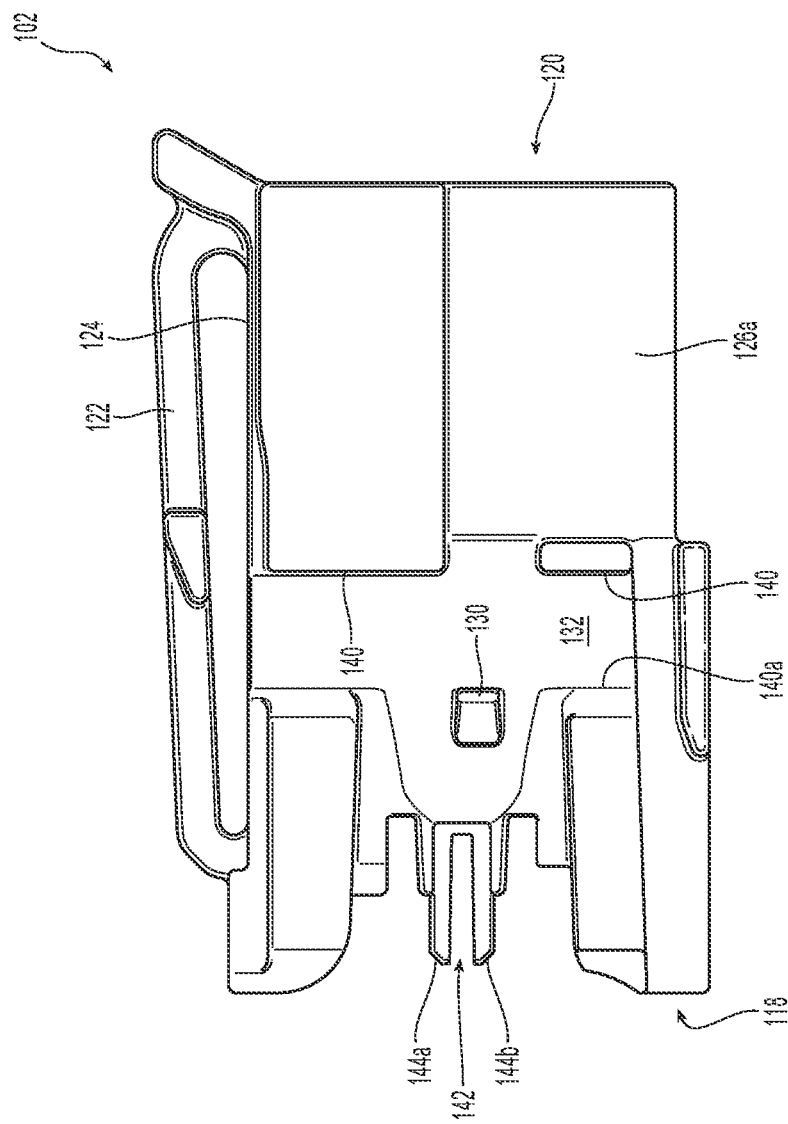
FIG. 4 is a side elevation view of the first portion of the fiber optic connector housing.
Figure 17:
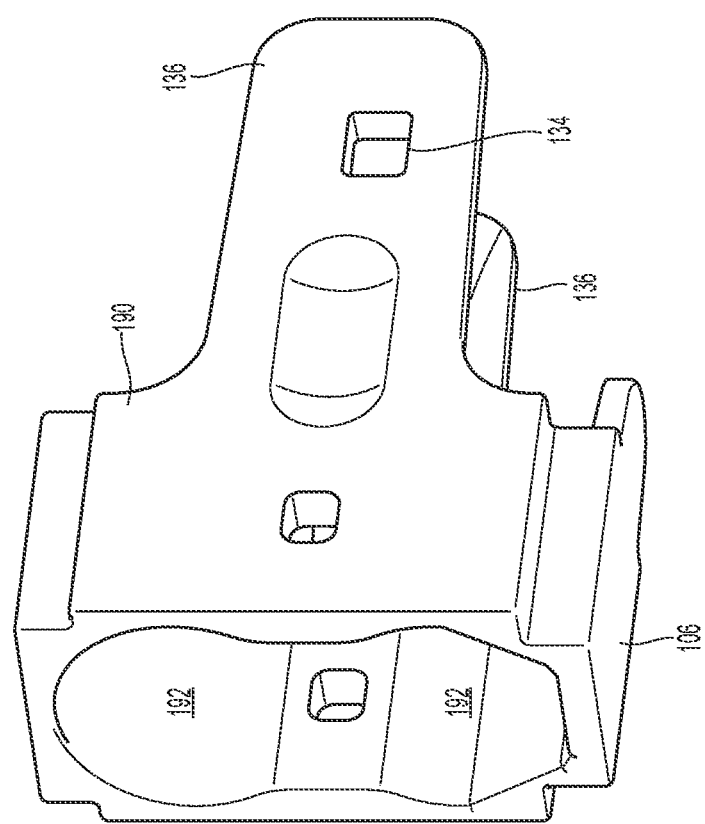
FIG. 17 is a front perspective view of the third portion of the fiber optic connector housing.
Figure 16:
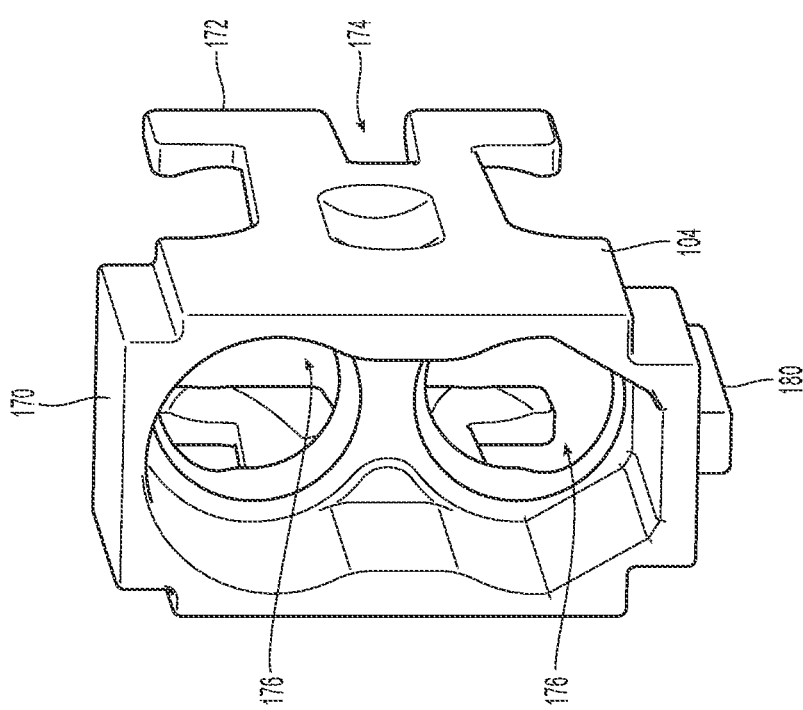
FIG. 16 is a front perspective view of the second portion of the fiber optic connector housing.

The first portion 102 has opposing side walls 126a,126b that provide structures for the attachment of the second portion 104 and the third portion 106 to the first portion 102. See, e.g., FIGS. 4-6. These structures will be discussed in more detail below with regard to each of the second and third portions 104,106. However, on an outside part of each of the side walls 126a,126b is a detent 130 as well as a recessed portion 132. The detents 130 are positioned to engage openings 134 in an arm 136 of the third portion 106 to removably retain the third portion 106 on the first portion 102. See FIGS. 1B, 10, and 17. The openings 134 may also be depressions on an inside portion of the arm 136 and not extend all the way through the arm 136. It should also be noted that the end 138 of the arm 136 is partially blocked by the structures (forward facing surfaces in one embodiment) 140 on each the opposing side walls 126a,126b formed in part by the recess 132. See FIG. 4.

As illustrated in FIGS. 3-6, the first portion 102 has openings 116a,116b, more particularly an upper opening 116a and a lower opening 116b. (The reference to upper and lower are for ease of reference in discussing the structures and could be reversed. Thus, the intention is not to be limited by these conventions) The upper opening 116a and the lower opening 116b are separated by two resilient members 144a and 144b. As discussed in more detail below, the resilient members 144a and 144b are to bias the two fiber optic ferrule holders 112 against the first portion 102. In fact, the resilient members 144a and 144b bias the two fiber optic ferrule holders 112 against two restraining bumps 146a and 146b that are disposed within the upper opening 116a and the lower opening 116b, respectively. See FIGS. 5 and 6. The restraining bumps 146a,146b may be optional, and if so, the two resilient members 144a,144b bias the two fiber optic ferrule holders against the surfaces on which the restraining bumps 146a,146b are provided. This positions the fiber optic ferrules 114 in the appropriate position for polishing, and subsequently, mating with another fiber optic connector. See, e.g., FIGS. 18 and 19. There is a gap 142 that is disposed between the resilient members 144a and 144b to allow for the resilient members 144a and 144b to flex during insertion and/or removal of the fiber optic ferrule holders 112 from the first portion 102.

Figure 6:
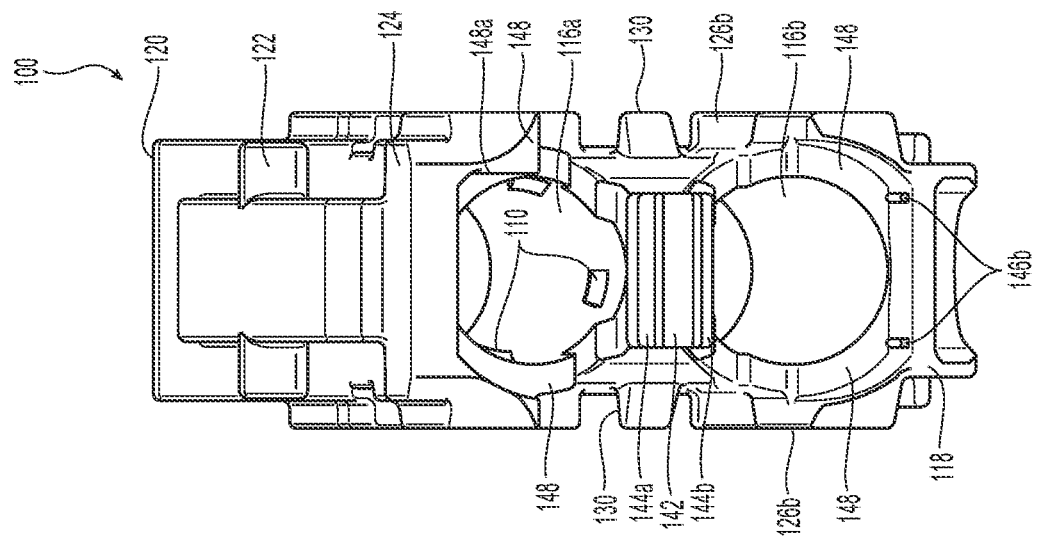
FIG. 6 is a perspective view of the first portion of the fiber optic connector housing from the front top.
Figure 5:
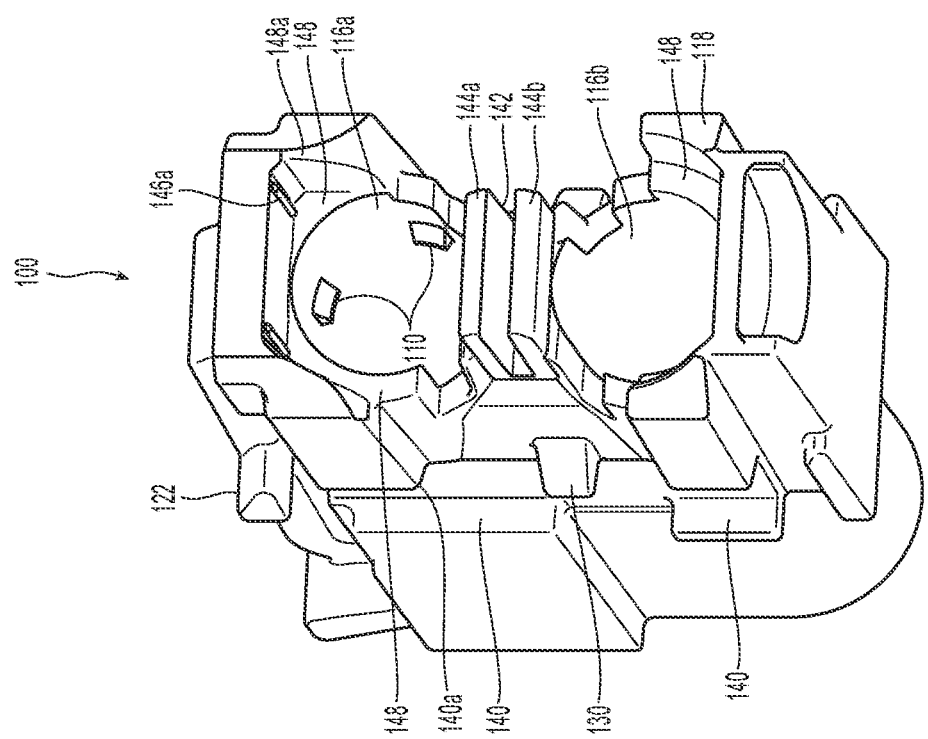
FIG. 5 is a perspective view of the first portion of the fiber optic connector housing from the front bottom.

Each of the upper opening 116a and the lower opening 116b have ferrule stop surfaces 148 that prevent the fiber optic ferrule holders 112 from moving rearward in the first portion 102. These are best seen in FIGS. 5 and 6. In certain situations, the fiber optic ferrules 114 too may not be able to move longitudinally. Since the first portion 102 has these flat, immovable surfaces 148, there is no spring within the connector housing 100, making the duplex connector (utilizing the fiber optic connector housing 100) springless. Thus, the fiber optic connector housing 100 may have to be mated to another connector that has a spring biasing the fiber optic ferrules.

As noted above, one of the two fiber optic ferrule holders 112 will be rotated after the fiber optic ferrules 114 are polished. In the illustrated embodiment, the fiber optic ferrule holder 112 in the lower opening 116b will be the one that is to be rotated. In order to rotate the fiber optic ferrule holder 112, the second portion 104 is removed from the first portion 102, the fiber optic ferrule holder 112 is pulled forward until a flange 150 on the fiber optic ferrule holder 112 clears the first portion 102. See, e.g., FIG. 7. This movement may cause some movement in the fiber optic ferrule in the upper opening 116a. However, there are a plurality of detents 110 in the upper opening 116a to engage the fiber optic ferrule holder 112. These detents 110, along with the flange 150 engaging the ferrule stop surfaces 148, prevent the fiber optic ferrule holder 112 in the upper opening 116a from moving forward relative to the first portion 102. There is also a rotational stop surface 148a that prevents the fiber optic ferrule holder 112 in the upper opening 116a from rotating relative to the first portion 102. See FIG. 5 and also FIG. 9A. The rotational stop surface 148a is a side wards facing surface in that it faces towards the side wall 126b and the upper opening 116a. It also engages a surface 156b on the fiber optic ferrule holder 112 when the fiber optic ferrule holder 112 is inserted into the upper opening 116a. It should also be noted that the rotational stop surface 148a will prevent the fiber optic ferrule holder 112 from correctly engaging the stop surfaces 148 and the second or third portions 104,106 if the fiber optic ferrule holder 112 is not in the appropriate position. With a keen eye, it is also noted that there is no corresponding rotational stop surface for the lower opening 116b. This is because the fiber optic ferrule holder 112 does rotate in the lower opening 116b, which is illustrated below with regard to FIGS. 9A-C. In FIG. 9B, the fiber optic ferrules 114 are in the same orientation (a polishing position), whereas in FIG. 9C, one of the ferrules 114 (in one of the ferrule holders 112) has been rotated, with the other being in a substantially fixed position (or, substantially stationary) relative to the first portion 102 and the fiber optic connector housing 100 overall. The term "substantially" in the context of the fixed position refers to having very little to no angular movement, and also very little to no longitudinal movement. It should be noted that, in an alternative embodiment, the fiber optic ferrule holder 112 in the upper opening 116a could be the one that is rotated and the one in the lower opening 116b remains in the same position, with the appropriate changes made to the first portion 102.

Figure 7:
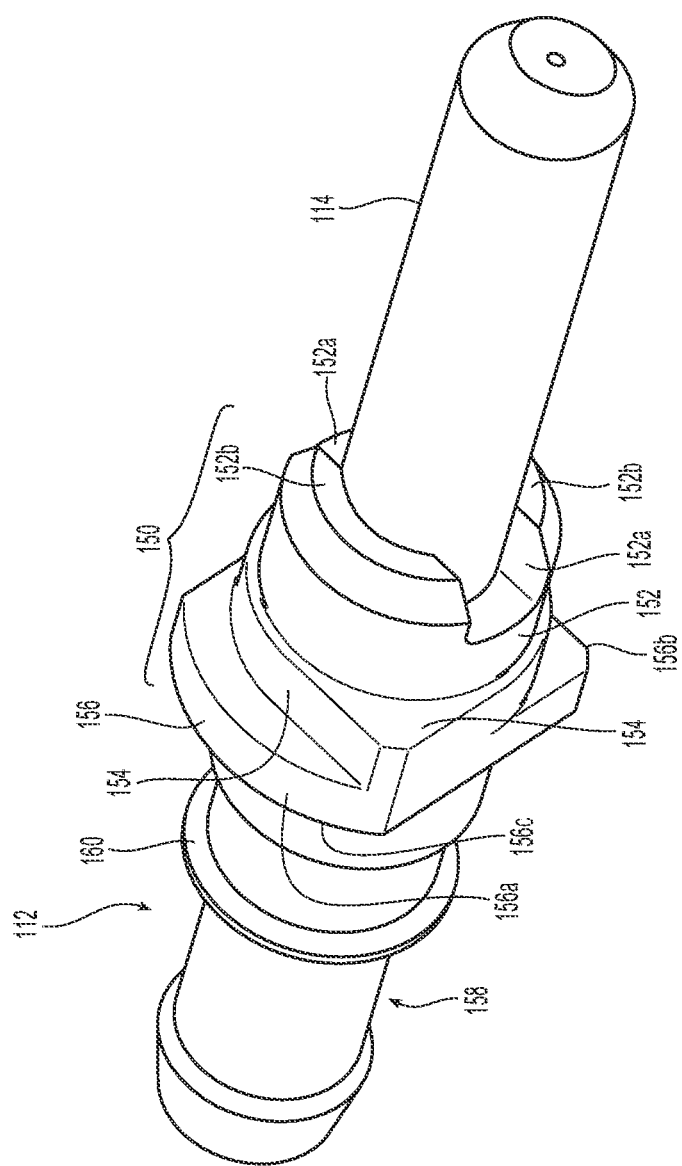
FIG. 7 is a perspective view of a fiber optic ferrule holder and fiber optic ferrule that can be used with the fiber optic connector housing of FIG. 1A.
Figure 8:
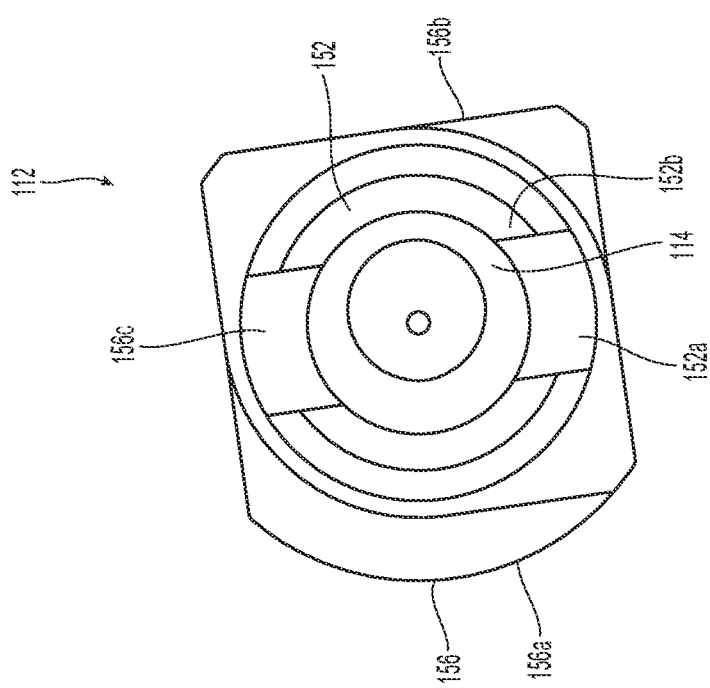
FIG. 8 is an front view of the fiber optic ferrule holder and fiber optic ferrule in FIG. 7.

The fiber optic ferrule holder 112 will now be discussed with reference to FIGS. 7 and 8. The fiber optic ferrule holder 112 is described in detail in Applicant's Patent Applicant Serial No. PCT/US21/33718, the contents of which are incorporated by reference herein in their entirety.

The fiber optic ferrule holder 112 has a flange 150 that preferably surrounds the fiber optic ferrule 114 in its entirety. The flange 150 has a front section 152, a middle section 154 and a rear section 156. The flange front section 152 is the section of the flange 150 that surrounds most of the fiber optic ferrule. See FIG. 7. The flange front section 152 may include two notches 152a extending rearwardly from a front edge 152b. These notches 152a may be used to rotate one fiber optic ferrule 114 (and fiber optic ferrule holder 112) after polishing the fiber optic ferrules 114. For example, a tool may be inserted into the notches 152a to rotate the fiber optic ferrule holder 112, and hence, the fiber optic ferrule 114.

The flange rear section 156 has a portion 158 that extends rearwardly from the flange rear section 156. The flange middle section 154 is between the flange front section 152 and rear section 156, and has an eye-shaped profile when viewed from the front of the fiber optic ferrule 114. The flange rear section 156 has features or surfaces that interact with the fiber optic ferrule holder 112 and the second and third portions 102,104.

The flange rear section 156 has a flange curved surface 156a and a flat surface 156b opposite the curved surface 156a that engage the first portion 102 to ensure that the fiber optic ferrule holders 112 are in the correct position for each of the second portion 104 and the third portion 106 to be attached to the first portion 102. The size of the flange rear section 156 provides a rearward facing surface 156c that functions as a surface that engages the ferrule stop surfaces 148 and prevent the fiber optic ferrules 114 from moving rearward in the fiber optic ferrule holder 112.

The portion 158 of the rear section 156 has a circumferential surface 160 that engages the detents 110. The circumferential surface 160 faces forward while a corresponding engagement surface on the detents 110 faces rearwardly. See, e.g., FIGS. 5-6 and 11. While the circumferential surface 160 may circumscribe the entire circumference, it must not do so; there could be separate portions that engage the detents 110. Similarly, the detents 110 could be bigger than those illustrated in FIGS. 5 and 6.

Figure 9C:
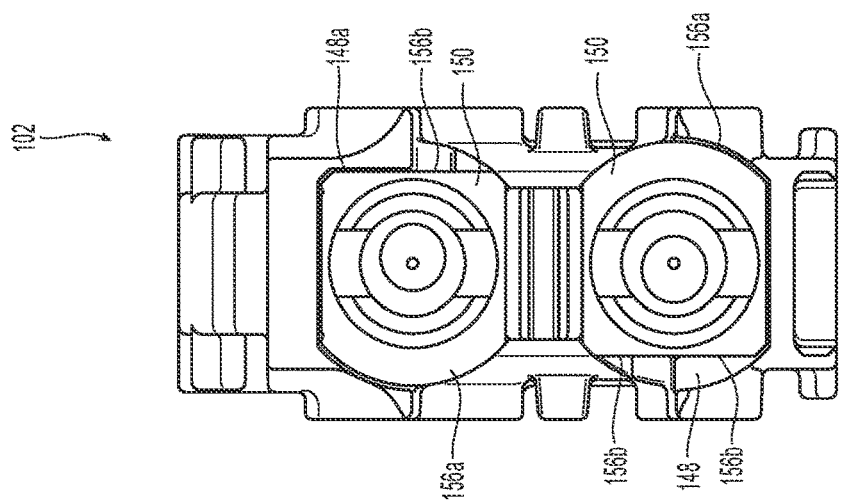
FIG. 9C is a front view of the first portion of the fiber optic connector housing with the caps removed for clarity and one of the fiber optic ferrule holders and fiber optic ferrules rotated from the polishing position to the mating position.
Figure 9B:
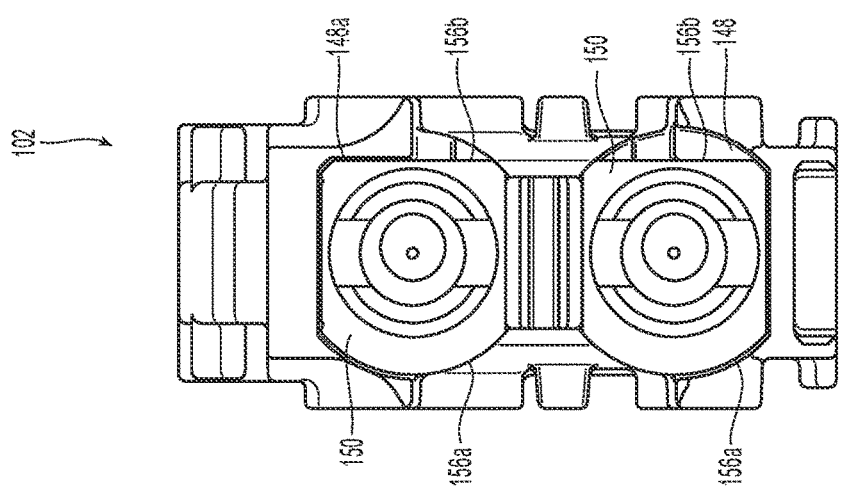
FIG. 9B is a front view of the first portion of the fiber optic connector housing with the caps removed for clarity and the fiber optic ferrule holders and fiber optic ferrules in the same position for polishing.
Figure 9A:
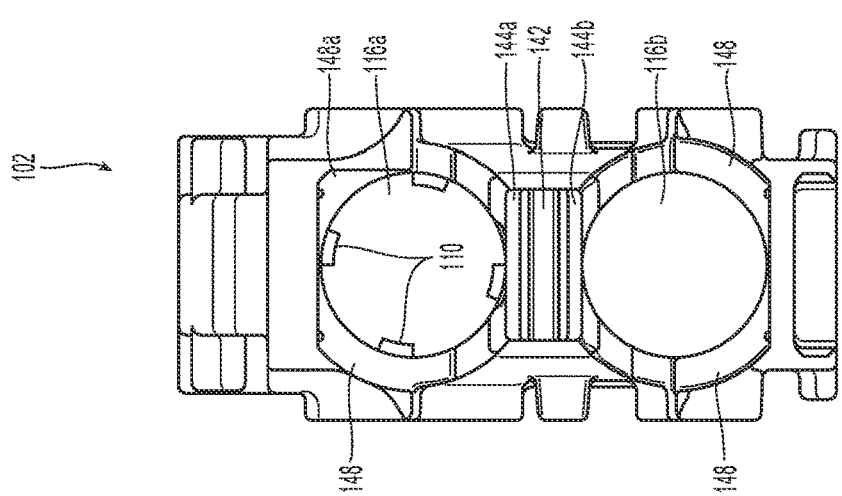
FIG. 9A is a front view of the first portion of the fiber optic connector housing with the caps and fiber optic ferrule holder and fiber optic ferrules removed for clarity.

Turning to FIGS. 9A-C (and also with reference to FIGS. 3 and 10), the movement of the fiber optic ferrule holders 112 within the first portion 102 will be described. As is evident in FIG. 9A, only the first portion 102 is illustrated, with no fiber optic ferrule holders 112 or the second portion 104 or the third portion 106. In the upper opening 116a, the detents 110 are visible. Additionally, the ferrule stop surfaces 148 and the rotational stop surface 148a are seen. It should be noted that the ferrule stop surfaces 148 around the lower opening 116b are generally circular around the entire circumference of the lower opening 116b. In contrast, the ferrule stop surfaces 148 in the upper opening 116a are circular only on the left side of the upper opening 116a. The rotational stop surface 148a presents a flat surface in the upper right corner of the upper opening 116a. This prevents the fiber optic ferrule holder 112 in the upper opening 116a from being rotated because the curved surface 156a of the flange 150 will hit the front of rotational stop surface 148a and not be seated against the ferrule stop surfaces 148. This also prevents the second portion 104 and the third portion 106 from engaging the first portion 102 incorrectly.

In FIG. 9B, the fiber optic ferrule holders 112 are both positioned the same way, in a first position, with the curved surface 156a of the flange 150 on the left side. (It is also clear that the fiber optic ferrules 114 have already been polished). The flat surface 156b of the fiber optic ferrule holder 112 may engage the rotational stop surface 148a in the upper opening 116a. However, there is no corresponding flat surface for the lower opening 116b. As noted below, the second portion 104 will ensure that the lower fiber optic ferrule holder 112 is in the correct orientation.

In FIG. 9C, the bottom fiber optic ferrule holder 112 has been rotated 180° to a second position and now the curved surface 156a of the flange 150 is on the right side in the figure, where it was on the left side in FIG. 9B. Note that a portion of the ferrule stop surface 148 in the bottom left side of the lower opening 116b is now visible. It is also clear in both FIGS. 9B and 9C that the flanges 150 are behind the resilient members 144a and 144b. Accordingly, the fiber optic ferrule holder 112 in the upper opening 116a has no movement and is stationary relative to the first portion 102.

As noted above, there are two caps or other portions that are used with the first portion 102. The first of those is the second portion or polishing cap 104, which is used during the polishing of the fiber optic ferrules 112. The second portion 104 is removably attached to the first portion 102. The second portion has a main body 170 with two leg extensions 172 extending in a rearward direction from opposing sides of the main body 170. The leg extensions 172 fit within the recessed portion 132 and engage the structures 140 (the forward facing surfaces that form a portion of the recessed portion 132). Additionally, the leg extensions 172 engage rearward facing structures 140a that are also adjacent the recessed portion 132. The leg extensions 172 generally form the shape of a "T," with there being an opening 174 through the cross bar and into the stem of the "T." The leg extensions 172 could take on other shapes as well with accommodating changes made to the first portion 102. The detent 130 fits within the opening 174 and it does not play a part in retaining the second portion 104 on the first portion 102.

The second portion 104 has two openings 176 to receive at least a portion of the fiber optic ferrules 114 (see FIGS. 1A, 12-14 and 16) when attached to the first portion 102. A portion of the fiber optic ferrule holder 112 may also be disposed within a portion of the openings 176. The openings 176 may be separate or they may be in communication with one another. The second portion 102 may also have a key 180 on one of the sides of the main body 170 to orient the fiber optic connector housing 100 relative to a polishing jig. See, e.g., FIG. 18. There could be other ways that provide for the orientation of the fiber optic connector housing 100 to a polishing jig 200. In addition, the presence of the key 180 ensures that there is a visual and a tactical difference between the polishing cap 104 and the final cap 106. Due to the key 180, a user cannot accidentally install the polishing cap again and try to insert the duplex connector into an adapter (since the key 180 will resist such insertion). This will cue the user to double check for the correct installation and assembly of the duplex connector utilizing the fiber optic connector housing 100.

In the interior of the main body 170 there is at least one projection 182 that extends from an interior wall 184. The projection 182 has an engagement surface 186 to engage the flat surface 156b (opposite the curved surface 156a) of the flange 150 on the fiber optic ferrule holder 112. In second portion 104 illustrated in FIGS. 12 and 14, the projection 182 is separated into two pieces by a central piece 188. However, the central piece 188 may not be present. It is clear that if the two fiber optic ferrule holders 112 are not positioned for polishing, i.e., like the polishing position illustrated in FIG. 9B, the second portion (polishing cap) 104 will not attach to the first portion 102 because the projection 182, and the engagement surface 186 in particular, would hit the flange 150 of the fiber optic ferrule holder 112 (the curved surface 156a) preventing the leg extensions 172 from aligning with the recessed portion 132. The orientation will then need to be changed to allow for the second portion 104 to be attached.

When the second portion 104 is attached to the first portion 102, the second portion 104 assists in retaining the fiber optic ferrule holders 112 in the first portion 102. The second portion 104 also assists in locating the fiber optic ferrules 114 in relation to a polishing jig 200. See FIGS. 18 and 19. Again, clearly only one of the second portion 104 or the third portion 106 can be attached to the first portion 102 at a time.

After the fiber optic ferrules 114 have been polished (see, e.g., FIG. 10), the polishing cap (second portion 104) is removed from the first portion 102 and the fiber optic ferrule holder 112 in the lower opening 116b has been rotated, then the third portion (utility cap) 106 can be attached to the first portion 102. See, e.g., FIG. 9C for only one rotated fiber optic ferrule holder 112. The third portion 106 is designed to remain on the first portion 102 longer (mating with another connector and/or device in an adapter) and have a sturdier connection to the first portion 102. As noted above the third portion 106 has an arm 136 that engages the detent 130. With the arm 136 being generally thicker and with the protection of the structures (surfaces) 140, the arm 136 takes more effort to remove than the polishing cap 104.

Figure 15:
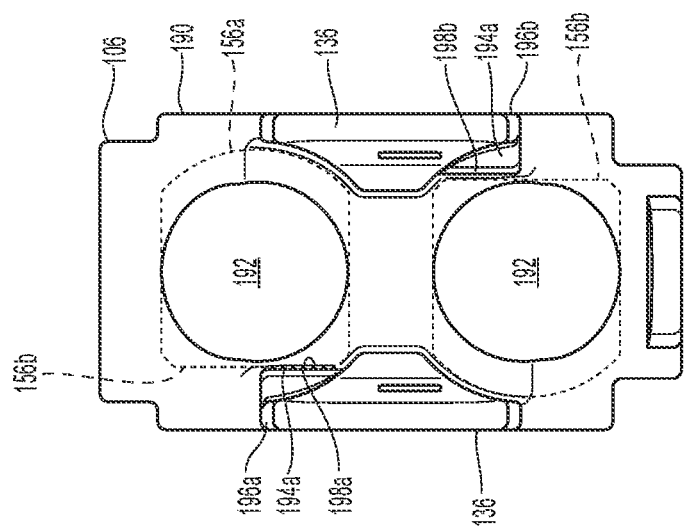
FIG. 15 is a rear view of the third portion of the fiber optic connector housing.
Figure 14:
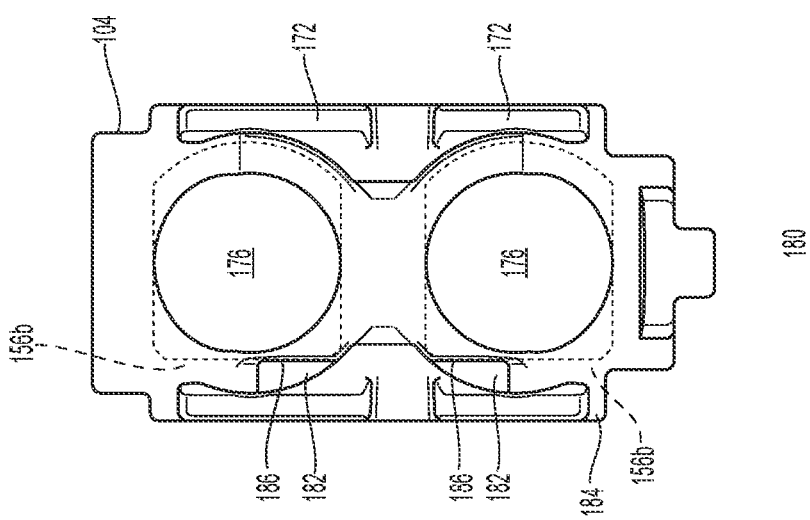
FIG. 14 is a rear view the second portion of the fiber optic connector housing.

The third portion 106 has a main body 190 and the two arms 136 extending in a rearward direction from opposing sides of the main body 190. The main body 190 has two openings 192 to receive at least a portion of the fiber optic ferrules 114 (see FIGS. 1B and 17) when attached to the first portion 102. A portion of the fiber optic ferrule holder 112 may also be disposed within a portion of the openings 192. The openings 192 may be separate or they may be in communication with one another. In the interior of the main body 190 there are at least two projections 194a, 194b that extend from an interior wall 196a,196b. The projections 194a, 194b each have an engagement surface 198a,198b to engage the flat surface 156b (opposite the curved surface 156a) of the flange 150 on the fiber optic ferrule holder 112. See FIG. 15. Since the lower fiber optic ferrule holder 112 has been rotated, the flat surfaces 156b are now on opposite sides of the main body 190. See FIGS. 9C and 15. Thus, the engagement surfaces 198a,198b are now on opposite sides, as compared to the engagement surfaces 186 of the second portion 104. See FIG. 15. With the engagement of the engagement surfaces 198a,198b with the flat surfaces 156b, the fiber optic ferrules 112 are held tightly for mating with another connector or device. Also, it can be easily recognized that if the fiber optic ferrule holder 112 in the lower opening 116b is not rotated, then the third portion 106 will hit the flange 150 (and the curved surface 156a), preventing the third portion 106 from engaging the detents 130.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic connector housing for a duplex connector comprising:
   a first portion for receiving two fiber optic ferrule holders, the fiber optic ferrule holders having a fiber optic ferrule disposed in each of the fiber optic ferrule holders, one of the fiber optic ferrule holders rotatable from a first position to a second position and the second fiber optic ferrule holder being substantially stationary relative to the first portion; and
   a second portion removably attachable to the first portion, the second portion having openings therein to receive the fiber optic ferrules therethrough and at least one projection extending from and along a first inside wall and having at least one engagement surface, the at least one engagement surface configured to engage a surface on each of the fiber optic ferrule holders in the first position.

2. The fiber optic connector housing for a duplex connector according to claim 1, wherein the at least one projection comprises a first projection and a second projection and the at least one engagement surface comprises a first engagement surface on the first projection and a second engagement surface on the second projection and each of the first engagement surface and the second engagement surface engage a respective surface on the fiber optic ferrule holders in the first position.

3. The fiber optic connector housing for a duplex connector according to claim 1, wherein the first portion is a polishing cap for insertion into a polishing jig.

4. The fiber optic connector housing for a duplex connector according to claim 2, wherein the first engagement surface and the second engagement surface engage the same corresponding surface on a respective fiber optic ferrule holder.

5. The fiber optic connector housing for a duplex connector according to claim 1, wherein the first portion is a final cap, the final cap configured to mate with a receptacle having a duplex connector therein.

6. The fiber optic connector housing for a duplex connector according to claim 1, wherein the polishing cap retains at least one of the fiber optic ferrule holders within the first portion when in the first portion.

7. The fiber optic connector housing for a duplex connector according to claim 1, wherein the fiber optic connector is springless.

8. The fiber optic connector housing for a duplex connector according to claim 1, further comprising detents in the first portion to engage the fiber optic ferrule holder.

9. The fiber optic connector housing for a duplex connector according to claim 1, further comprising a third portion, the third portion removably attachable to the first portion when the second portion is unattached, the third portion having openings therein to receive the fiber optic ferrules therethrough, a third projection extending from and along a first inside wall and having an engagement surface to engage one of the two fiber optic ferrule holders, and a fourth projection extending from and along a second inside wall on an opposing side of the third portion and having an engagement surface to engage the other of the two fiber optic ferrule holders.

10. The fiber optic connector housing for a duplex connector according to claim 9, wherein the third portion will not attach to the first portion unless the fiber optic ferrule holder has been rotated relative thereto from the first position.

11. The fiber optic connector housing for a duplex connector according to claim 9, wherein the third portion is only attachable to the first portion when one of the fiber optic ferrule holders is in the second position.

12. The fiber optic connector housing for a duplex connector according to claim 1, wherein the openings of the first portion are not identical.

13. A fiber optic connector housing for a duplex connector comprising:
    a first portion for receiving two fiber optic ferrule holders, the fiber optic ferrule holders having a fiber optic ferrule disposed in each of the fiber optic ferrule holders, one of the fiber optic ferrule holders rotatable from a first position to a second position and the second fiber optic ferrule holder being substantially stationary relative to the first portion;
    a second portion removably attachable to the first portion, the second portion having openings therein to receive the fiber optic ferrules therethrough and at least one projection extending from and along a first inside wall and having at least one engagement surface, the at least one engagement surface configured to engage a surface on each of the fiber optic ferrule holders in the first position; and
    a third portion, the third portion removably attachable to the first portion when the second portion is unattached, the third portion having openings therein to receive the fiber optic ferrules therethrough, a third projection extending from and along a first inside wall and having at least one engagement surface to engage one of the two fiber optic ferrule holders, and a projection extending from and along a second inside wall on an opposing side of the third portion and having at least one engagement to engage the other of the two fiber optic ferrule holders.

14. The fiber optic connector housing for a duplex connector according to claim 13, wherein the at least one projection comprises a first projection and a second projection and the at least one engagement surface comprises a first engagement surface on the first projection and a second engagement surface on the second projection and each of the first engagement surface and the second engagement surface engage a respective surface on the fiber optic ferrule holders in the first position.

15. The fiber optic connector housing for a duplex connector according to claim 13, wherein the first portion is a polishing cap for insertion into a polishing jig.

16. The fiber optic connector housing for a duplex connector according to claim 14, wherein the first engagement surface and the second engagement surface engage the same corresponding surface on a respective fiber optic ferrule holder.

17. The fiber optic connector housing for a duplex connector according to claim 13, wherein the first portion is a final cap, the final cap configured to mate with a receptacle having a duplex connector therein.

18. The fiber optic connector housing for a duplex connector according to claim 1, further comprising detents in the first portion to engage the fiber optic ferrule holder.

19. The fiber optic connector housing for a duplex connector according to claim 9, wherein the third portion will not attach to the first portion unless the fiber optic ferrule holder has been rotated relative thereto from the first position.

\* \* \* \* \*